United States Patent [19]
Leason et al.

[11] Patent Number: 6,044,797
[45] Date of Patent: Apr. 4, 2000

[54] DRINKING BOWL WITH AGITATOR FOR HOUSEHOLD PETS

[75] Inventors: David Leason, 176 E. 77, New York, N.Y. 10021; Scott L. Sullivan, Chappaqua, N.Y.

[73] Assignee: David Leason, New York, N.Y.

[21] Appl. No.: 08/971,664

[22] Filed: Nov. 17, 1997

Related U.S. Application Data

[60] Provisional application No. 60/031,340, Nov. 21, 1996.

[51] Int. Cl.[7] .................................................. A01K 7/00
[52] U.S. Cl. ............................ 119/72; 119/51.11; 119/61
[58] Field of Search ................................ 119/51.01, 51.5, 119/51.02, 61, 72, 51.11, 56.1, 902, 74; 222/650; D30/121; 433/80; 239/24, 25, 26, 27, 28, 29, 29.3, 21; 4/619

[56] References Cited

U.S. PATENT DOCUMENTS

| | | | |
|---|---|---|---|
| 223,907 | 1/1880 | Hammerstein | 4/540 |
| 487,842 | 12/1892 | King | 137/615 |
| 1,481,365 | 1/1924 | Hegel | 119/74 |
| 2,106,871 | 2/1938 | Hogsett | 119/74 |
| 3,410,487 | 11/1968 | Hyde | 239/26 |
| 3,680,780 | 8/1972 | Arbon | 239/26 |
| 4,149,490 | 4/1979 | English | 119/72 |
| 4,426,956 | 1/1984 | McKinstry | 119/72 |
| 4,675,924 | 6/1987 | Allison et al. | 4/620 |
| 4,769,863 | 9/1988 | Tegg et al. | 4/625 |
| 5,052,343 | 10/1991 | Sushelnitski | 119/78 |
| 5,199,118 | 4/1993 | Cole et al. | 4/619 |

FOREIGN PATENT DOCUMENTS

| | | | |
|---|---|---|---|
| 1722333-A1 | 3/1992 | U.S.S.R. | 119/51.11 |

OTHER PUBLICATIONS

Hammacher Schlemmer Catalog, "The Feline Drinking Fountain," undated, p. 59.

*Primary Examiner*—Michael J. Carone
*Assistant Examiner*—Son T. Nguyen

[57] ABSTRACT

A drinking bowl for household pets having an agitator is disclosed to prevent the water in the drinking bowl from remaining stagnant when a household pet is not drinking therefrom. The agitator may be an aerating device such as an air pump, a rotating impeller, or an acoustic or mechanical driver. The agitation may induce a circulation in the water so that debris floating therein can be collected. A backflow preventing device may also be included.

19 Claims, 6 Drawing Sheets

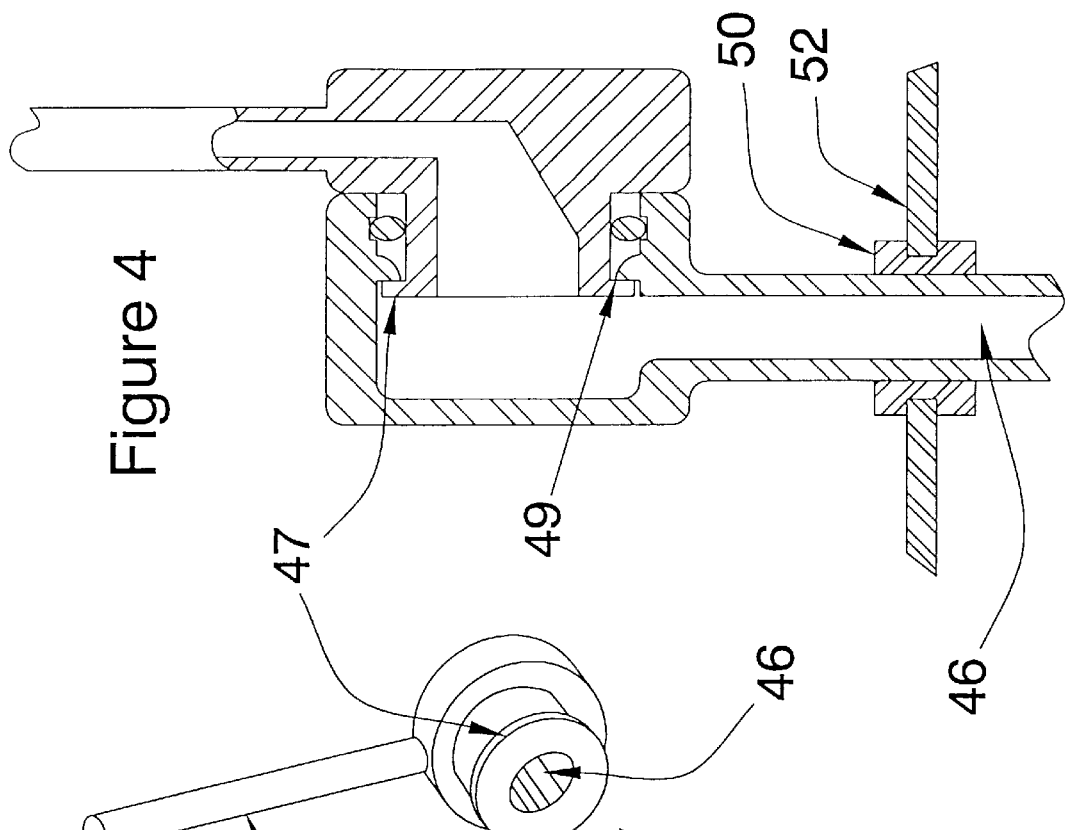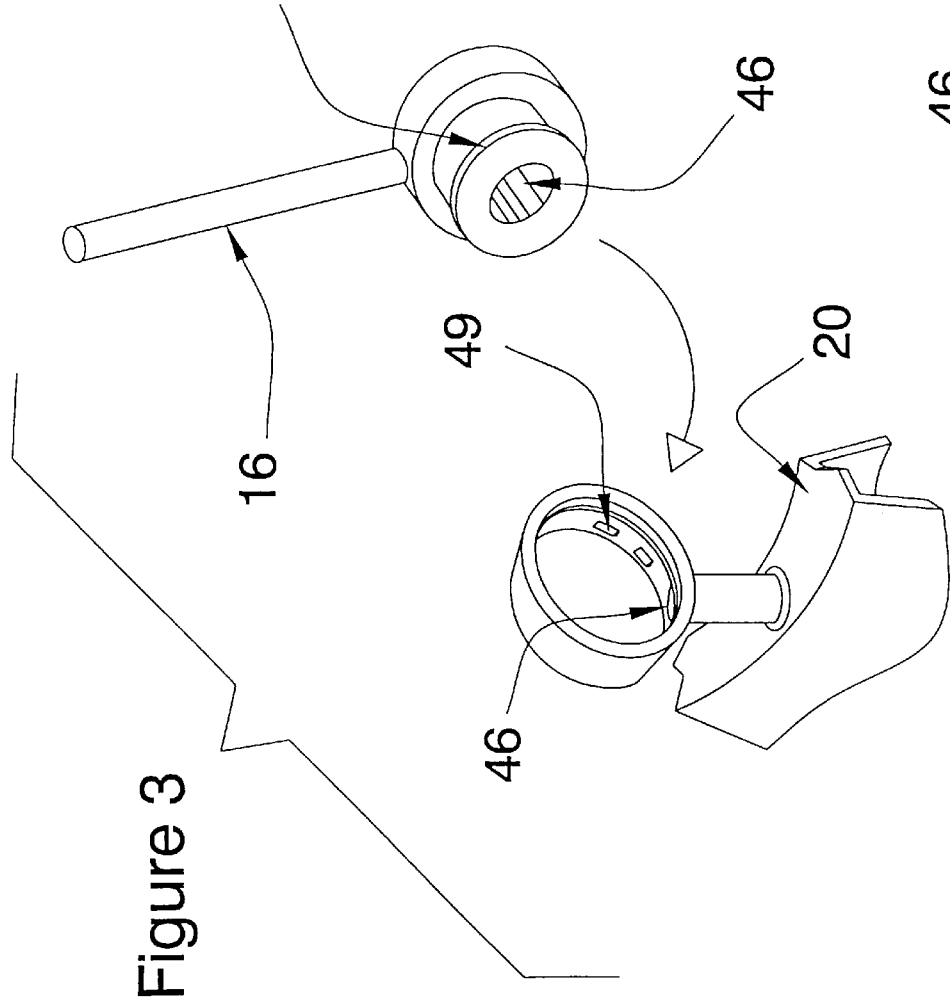

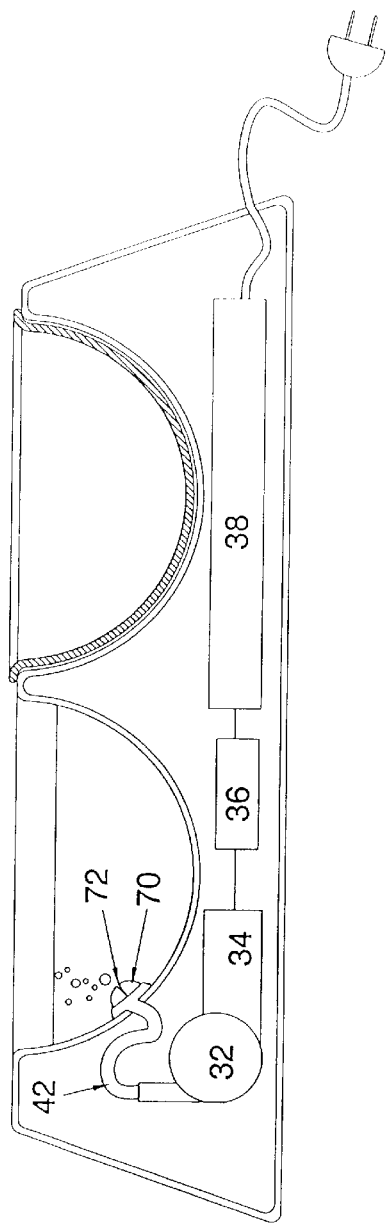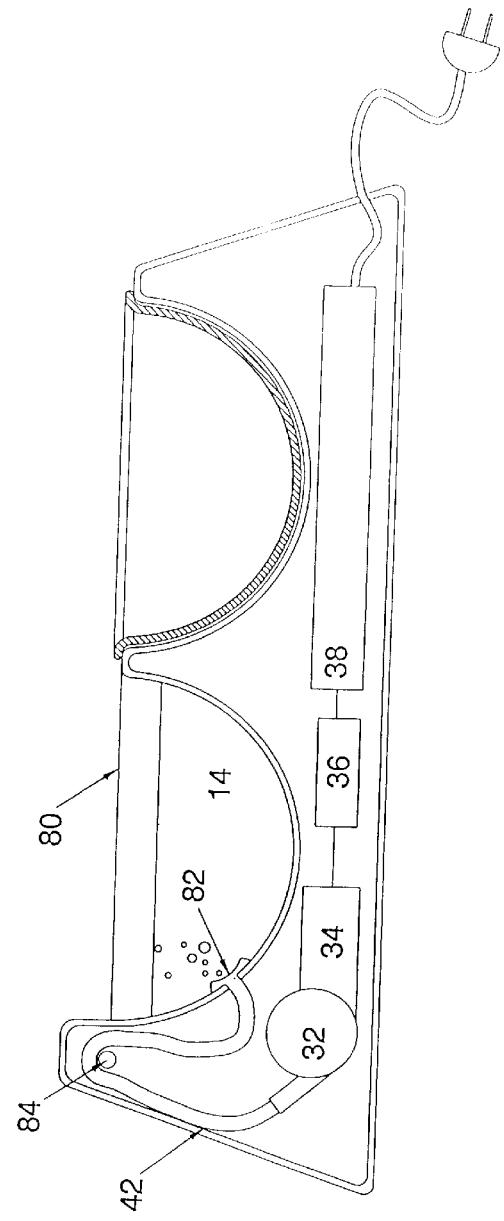

DRINKING BOWL WITH AGITATOR FOR HOUSEHOLD PETS

CROSS REFERENCE TO RELATED CASES

This application claims priority pursuant to 35 U.S.C. Section 119 from Provisional Application Ser. No. 60/031,340, filed Nov. 21, 1996, the entire disclosure of which is hereby incorporated by reference.

FIELD OF THE INVENTION

This invention relates to animal husbandry, and, more particularly, to a drinking bowl for household pets which includes an agitator for maintaining a supply of drinking water fresh.

BACKGROUND OF THE INVENTION

A problem in caring for household pets such as cats and dogs is how to provide fresh water when the pet owner is not around. One solution is to leave water running at a faucet, but this solution is attendant with substantial waste. Another solution which is commercially available has water recirculated through a water pump in the form of a fountain. The fountain returns water taken from the water bowl back to the bowl in the form of a free-falling stream of water. A problem perceived with this design is that the animal's head is subject to being splashed by the free-falling stream of water and to having the water stream pour onto its head as it attempts to drink. These problems may dissuade the animal from drinking except when it is exceptionally thirsty.

The present invention seeks to overcome these and other problems.

OBJECTS AND SUMMARY OF THE INVENTION

It is an object of the invention to prevent a household pet's drinking water from lying stagnant by agitating the water.

It is also an object of the invention to provide an entice to encourage a household pet to approach the water bowl and drink therefrom.

According to one aspect of the invention, a water dish for supplying drinking water to animals is described which includes a bowl for containing a reservoir of drinking water, a pump for supplying pressurized fluid, a conduit for delivering the pressurized fluid into the drinking water, and a pivot connected to the conduit for selectively positioning the conduit within the bowl so that the pressurized fluid is discharged through the drinking water to agitate same. The pressurized fluid may be air or water. The conduit may be positioned deep into the water or closer to the surface to yield different degrees of agitation. Also, the conduit may be rotated to induce a circulation in the water, and a filter may be provided to collect circulating debris such as animal hair.

According to another aspect of the invention, an impeller is used to agitate the water. A cage may be positioned around the impeller to protect the animal from injury.

According to yet another aspect of the invention, the water is agitated from below a high-water line of the drinking bowl using pressurized air. Backflow of water through the air tube is prevented by way of a backflow preventing device. This enables the air pump to have a duty cycle using a timer and controller circuit so as to not always be pumping air yet avoid the risk of shock that may result if there were a backflow of water.

These and other features and advantages of the invention will be readily apparent from the following detailed description of a preferred embodiment taken in conjunction with the accompanying unscaled drawings.

BRIEF DESCRIPTION OF THE DRAWINGS

FIG. 3 is an assembly view of a pivotal conduit assembly, according to the first embodiment of the invention, showing a partial sectional view of a base;

FIG. 4 is a sectional side view of the pivotal conduit assembly, taken along the lines 4—4 of FIG. 1;

FIG. 8 is a sectional side view, according to a third embodiment of the invention;

FIG. 9 is a sectional side view, according to the fourth embodiment of the invention.

DETAILED DESCRIPTION OF PREFERRED EMBODIMENTS

Figure 1:
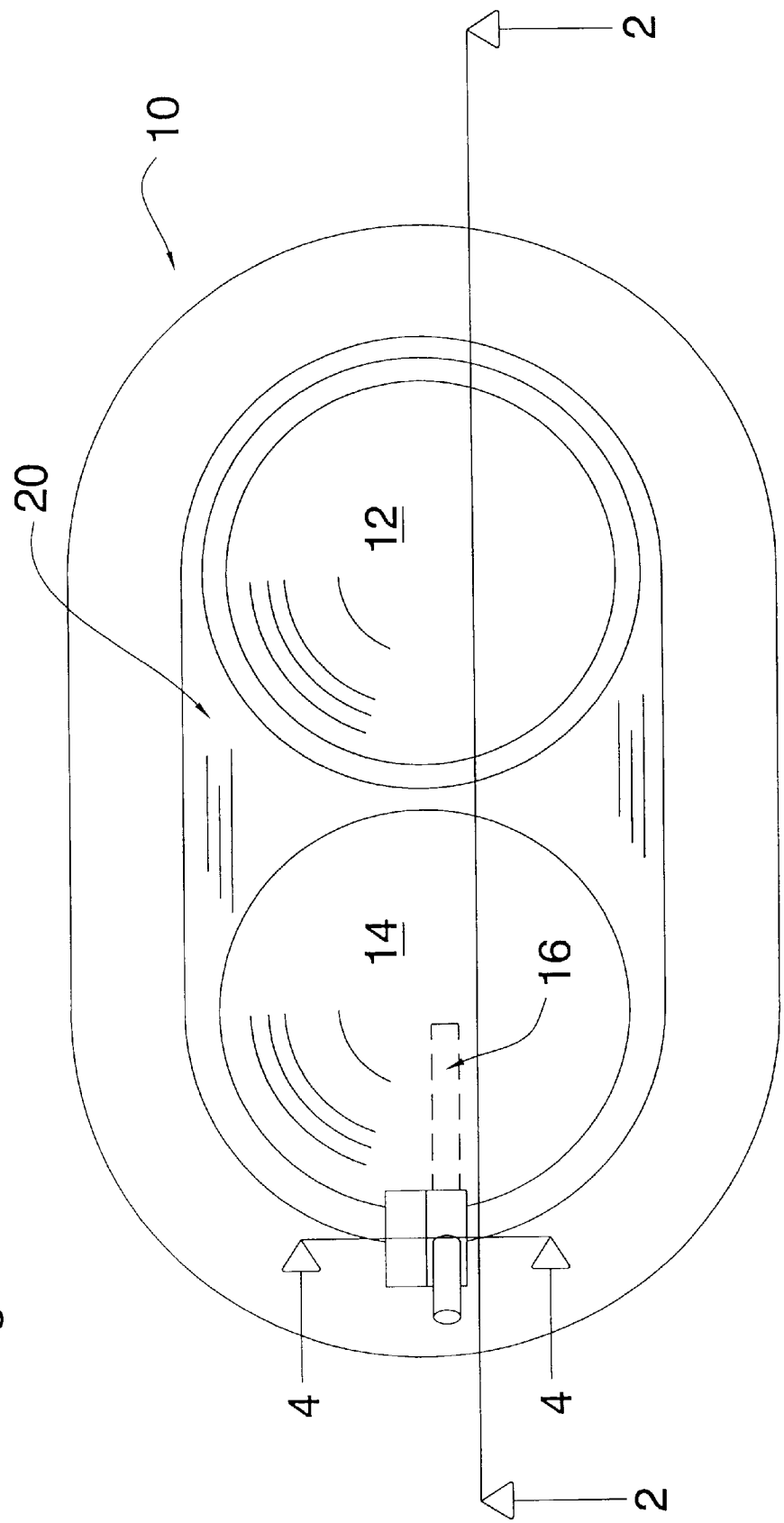
FIG. 1 is a plan top view of a water dish, in accordance with a first embodiment of the invention.

By way of overview and introduction, FIG. 1 illustrates a serving container or base 10 constructed according to a first embodiment of the invention. The serving container 10 includes a food bowl 12 and a water bowl 14, the water bowl being positioned to receive a supply of air under pressure from a pivotally mounted conduit 16 Apart from this positioning, the water bowl 14 may be identical to the food bowl 12. The pressurized air causes the surface of the water in the bowl 14 to bubble, the bubbles agitating the water to prevent the water from lying stagnant. Attendant with the bubbles is a gurgling sound which has been empirically found to entice animals to the serving container 10. Optionally, the food and water bowls 12, 14 can be removably mounted to the serving container 10 so that either can be removed for refilling or cleaning. Molded finger grips (not shown) may be provided to facilitate the removal of the bowls 12, 14.

Figure 2:
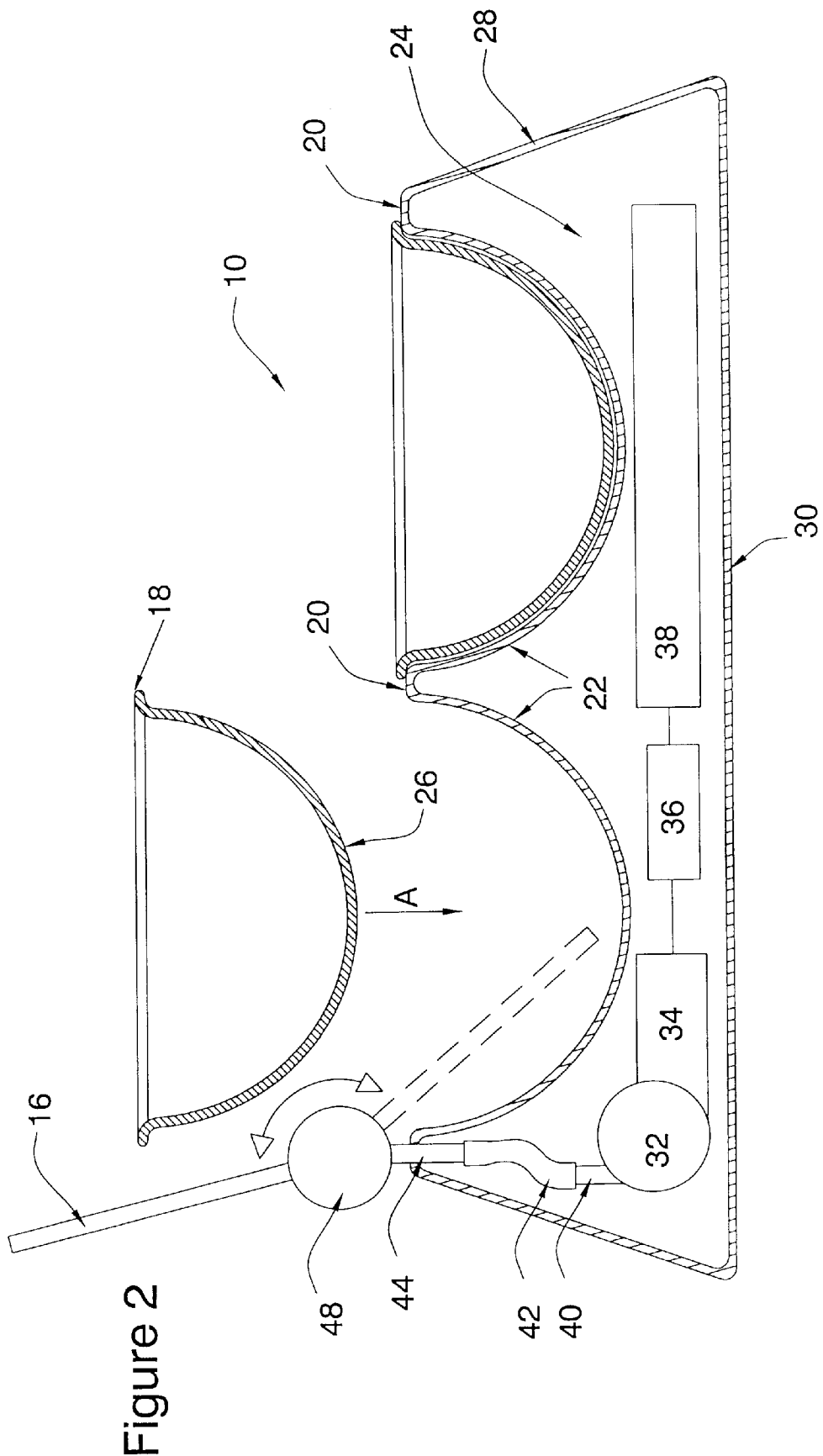
FIG. 2 is a sectional side view, according to the first embodiment of the invention, taken along the lines 2—2 of FIG. 1.

FIG. 2 illustrates further details of the construction of the serving container 10 according to the first embodiment. The bowls 12, 14 are generally hemispherical in shape and each includes a flange 18. The flange 18 is adapted to be supported by a top surface 20 of the serving container 10 when the bowls are seated in the container (see, for example, bowl 12 in FIG. 2). Preferably, the serving container 10 has a continuous top surface, including a pair of recessed surfaces 22 which receive the bowls 12, 14, to shield the electronic components 24, described below. More preferably, the serving container 10 has the recessed surfaces 22 formed with a complementary shape to the underside 26 of the bowls 12, 14. Sidewalls 28 extend downwardly from the top surface 20 to raise the bowls 12, 14 a predetermined distance. For example, the sidewalls 28 may raise the bowls 12, 14 a distance sufficient to house the electronic components 24. Alternatively, the electronic components 24 could be positioned between or alongside the bowls 12, 14 to minimize the vertical profile of the container. A bottom surface 30 encases the electronic components 24 in the preferred embodiment. It should be appreciated, however, that the particular placement of the electronic components 24 is not pertinent to the invention; they may be housed in a separate container, for example, to minimize vibration of the serving container 10.

With further reference to FIG. 2, the electronic components 24 comprise an agitator which includes an air pump 32, a pump motor 34, a timer and controller circuit 36, a battery pack 38 (which may be a conventional battery clip and one or more batteries), and (optionally) a battery cutoff switch which is responsive to insertion of a plug of an AC to DC converter (not shown). In the preferred embodiment, these components are serially connected in a manner well known in the art to provide power to the pump motor 34 thereby activating the air pump 32. The serving container 10 can be configured for operation exclusively with an AC to DC converter or a step down transformer in which case the battery pack 38 and the battery cutoff switch would be unnecessary and therefore not included.

The air pump 32 generates positive air pressure at its output 40, that is, pressure greater than one atmosphere. The air pump 34 conveys air pressure to the water in the bowl 14 by pumping air from its output 40 through a preferably flexible tube 42, through an arm 44 into a central aperture 46 (see FIGS. 3 and 4) of a pivot 48 and finally through the pivotally mounted conduit 16. The conduit is selectively pivoted downwardly (shown in phantom) after the food bowl has been inserted (in the direction of arrow A) so that the conduit 16 enters the water bowl 14. FIGS. 3 and 4 show details of the pivot 48 and the conduit 16, including protuberances 47 and complementary recesses 49 which lock the two halves of the pivot 48 together. The pivot 48 permits the insertion depth of the conduit 16 to be adjusted. A shallow insertion depth of the conduit 16 generates a multiplicity of small bubbles and rapid gurgling noises whereas a deep insertion depth generates larger bubbles and a what appears to be a deeper gurgling sound.

Figure 5:
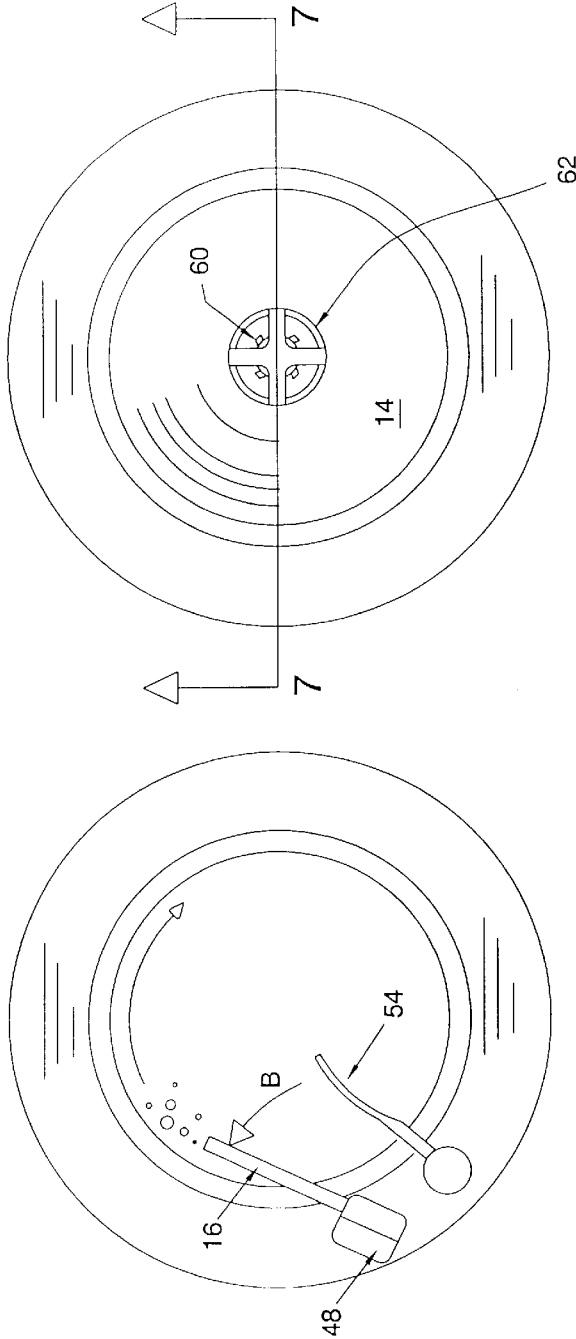
FIG. 5 is a plan view of a water dish, according to the first embodiment of the invention, showing details of the pivotal conduit and a pivotal filter located within the bowl.

Referring now to FIGS. 2 and 5, the conduit 16 is shown rotated in the direction of arrow B from a generally radial orientation to a more tangentially directed orientation. The conduit 16 so rotated induces a circulation of the water in the water bowl 14, such as the current flow illustrated in FIG. 5. The existence and force of the circulation is a function of the volume of air being pumped by the pump motor 34. Rotation is achieved by grasping the conduit 16 or pivot 48 and turning in a desired direction. To permit such rotation, the arm 44 may include an annular groove 50 which receives one or more fingers 52 associated with the housing of the serving container 10 (see FIG. 4). The fingers 52 engage the groove 50 and permit the conduit 16 to be rotated relative to the bowl 14.

FIG. 5 also shows an optional filter 54 which may be positioned in the water bowl 14 by pivotal movement or clipping thereof to the edge of the bowl 14. The filter 54 may comprise a bar for skimming the surface of the water or a mesh for catching circulating debris both at and below the surface of the water. The conduit 16, to an extent, can filter hair that may fall into the bowl. Preferably, the conduit 16 is provided with a roughened, knurled, or bumpy surface to more reliably catch debris and remove it from the circulating fluid. The circulating water causes any animal hair which may have landed in the water to revolve in the direction of the circulation and gather against the conduit 16 and/or filter 54. The circulation of water thus serves to keep the surface of the water clean and free of debris. The collected hair can easily be removed.

Figure 10:
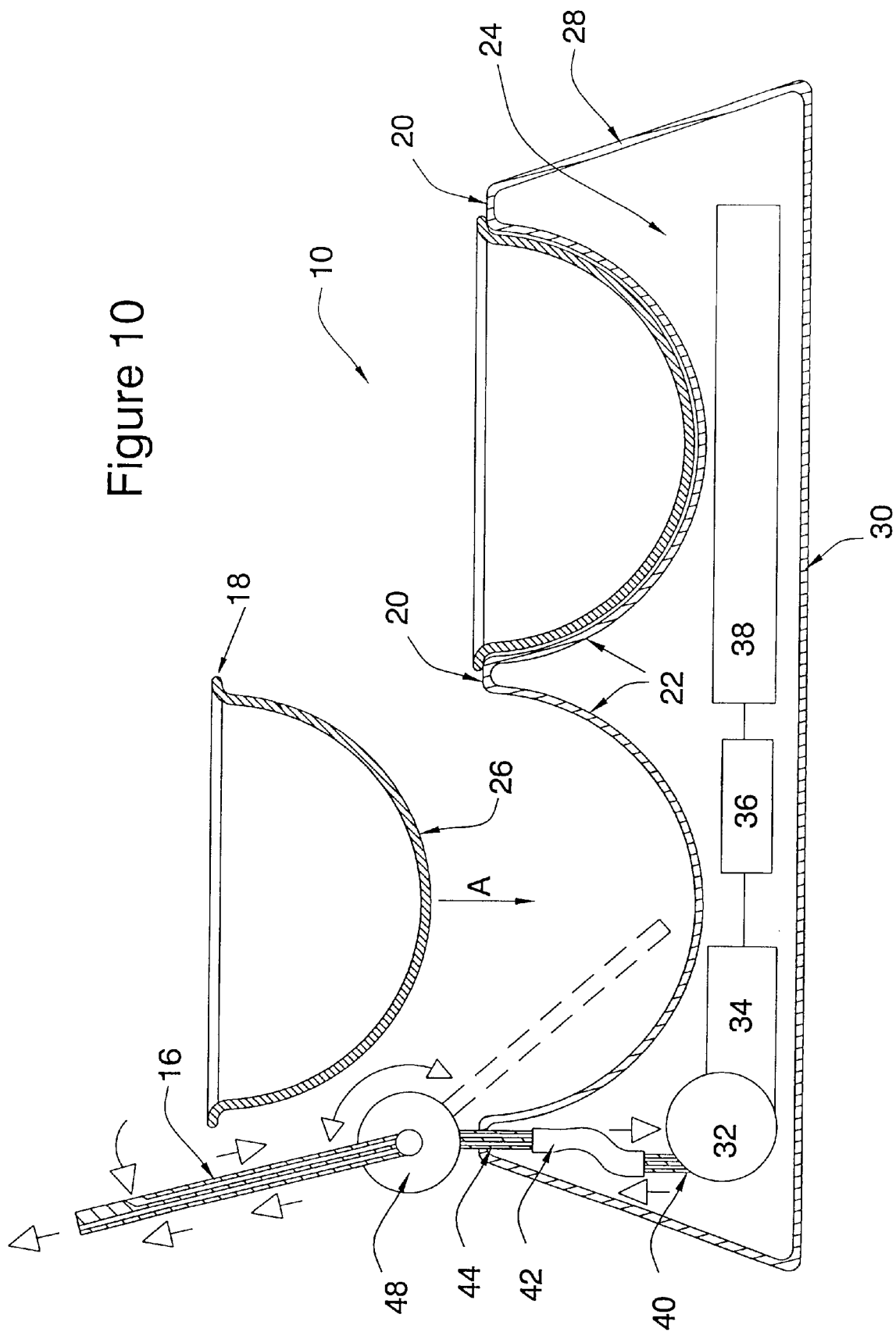
FIG. 10 is a sectional side view, according to a fifth embodiment of the invention.

As a modification of the foregoing, and as shown in FIG. 10, the air pump 32 could be replaced with a water pump to agitate the water. In this case, the conduit 16 may be provided with dual lumens, one for supplying water to the bowl 14 and another for drawing water from the bowl 14. Preferably, the apertures of the respective lumens is staggered to permit an even flow of water into and out of the bowl 14. The dual lumens extend through the pivot 48 and arm 44 generally as previously described for the single lumen arrangement of the first embodiment.

Figure 6:
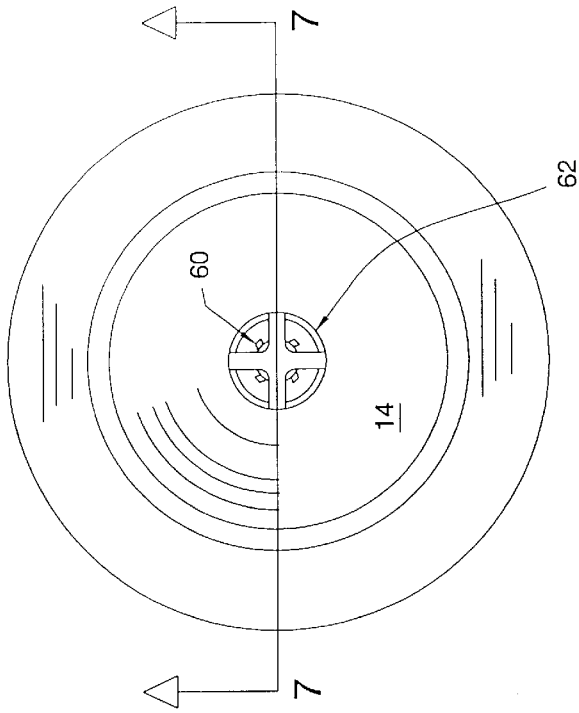
FIG. 6 is a plan view of a water dish, in accordance with a second embodiment of the invention, showing a rotatable impeller and a protective cage.
Figure 7:
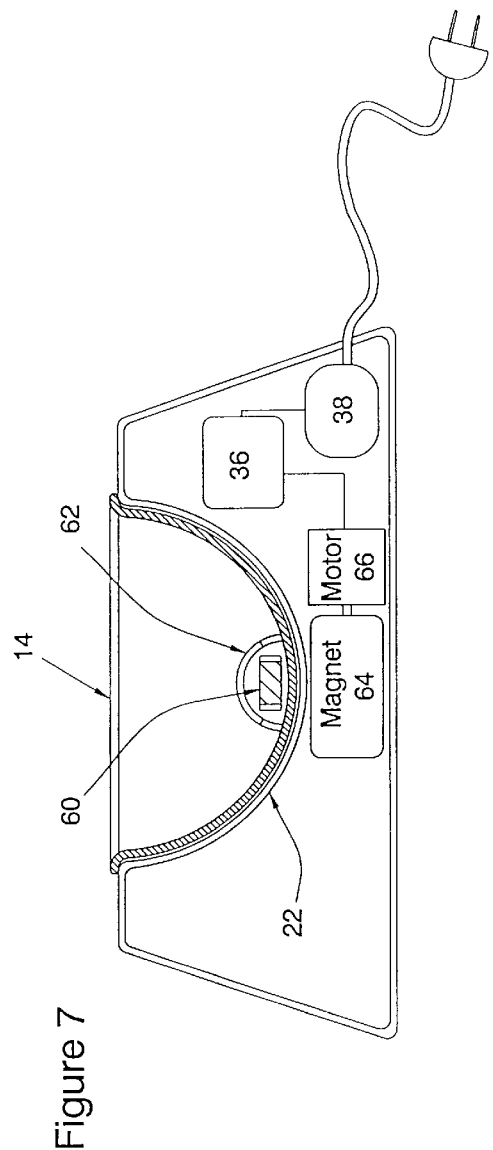
FIG. 7 is a sectional side view, according to the second embodiment of the invention, showing operative details, taken along the line 7—7 of FIG. 6.

Turning now to FIGS. 6 and 7, a second embodiment of the invention is shown in which the air pump 32 and conduit 16 have been replaced by a rotating impeller 60 which is mounted at the bottom of the bowl 14. Corresponding elements of this second embodiment have been accorded the same reference numbers as specified with regard to the first embodiment. The impeller 60 rotates in the direction of arrow C in order to agitate the water in the bowl 14 and thereby prevent stagnation. A cage 62 surrounds the impeller 60 and protects the animal from injury. FIG. 6 shows the arrangement of elements according to this second embodiment. The impeller 60 is inductively driven by a magnet 64 disposed immediately adjacent the bottom of the bowl 14, below the recessed surface 22. The magnet is preferably mounted on a rotatable shaft of a motor 66, for example, by epoxy. The motor is electrically driven by a series configured power circuit which may include the timer and controller circuit 36, the battery pack 38, and the battery cutoff switch as in the first embodiment.

The timer and controller circuit 36 need not be included; when the circuit 36 is incorporated in the agitator, it limits the current drain of the battery pack 38 by regulating the frequency and/or duration of the activated state of the electronic components that comprise the rest of the agitator circuit, for example, the pump motor 34 of the first embodiment. The circuit 36 may be constructed as a simple timer circuit based on an R-C time constant such as an RC timer circuit or TTL timer logic circuitry (for example, using a conventional 555 or 556 timer microprocessor). Alternatively, the time delay can be for random periods of time or user-settable periods of time. The particular manner of implementing the timer and controller circuit 36 is not pertinent to the invention; it can be implemented in a number of electrically or mechanically equivalent ways (for example, a wind-up gear arrangement), as understood by those skilled in the art.

Agitation can be achieved by other equivalent means such as by application of acoustic energy to vibrate the water or mechanical energy against the bowl 14 to vibrate its contents (namely, the water). The frequency and magnitude of such vibrations are to be selected to achieve sufficient agitation of the body of water so that it does not remain stagnant.

Agitation can also be achieved by introducing air from an air pump 32 through a bottom or side surface of the bowl 14 when a backflow preventing device is included. With reference now to FIG. 8, a siping valve 70 is shown disposed along the bottom or side surface of the bowl 14 in accordance with a third embodiment of the invention. In this embodiment, the bowl 14 is not removable from the serving container or base, although other arrangements in which the bowl is removable are within the scope of the invention. The siping valve 70 comprises the backflow preventing device of this embodiment, and may be constructed from an elastomeric material such as rubber. The siping valve 70 includes a slit or sipe 72 which functions as the valve by opening in response to a pressure gradient induced by the flow of air from the air pump 32 through the tube 42 (which need not be flexible) into the valve 70. The slit 72 is normally closed when there is no gradient or back flow of water. As a result of this arrangement, there is no flow or backflow of water out of the bowl 14.

An alternative way of stemming undesired flow out of the bowl 14 while introducing air through a bottom or side surface of the bowl 14 is shown in the embodiment of FIG. 9. In FIG. 9, the tube 42 (which need not be flexible) is arranged so that it includes a generally U-shaped bend above the high-water line 80 of the non-removable bowl 14. In accordance with well known siphon principles, water will not flow through the tube 42 above the water line of the bowl, even in the absence of air pressure supplied from the air pump 32 into the bowl 14 by way of the tube 42. The tube 42 preferably has a flange or flare 82 at one end to seat against the bowl 14, and is preferably clipped or otherwise restrained within the container, for example, at location 84 to ensure that the tube 42 remains above the highest possible water line 80.

The present invention may be used in combination with other known household feeding devices to impart the present advantages thereto. For example, the conduit 16 may be attached to a clip which permits the pressurized fluid (for example, air or water) to be introduced into a conventional bowl of water to which a pet already may be accustomed at a desired depth and with a desired angular orientation to cause a circulation.

Furthermore, the particular features described above in connection with the different embodiments can be arranged on different elements and in different combinations to achieve a serving container within the spirit of the foregoing disclosure.

Having thus described a preferred embodiment of the present invention, it is to be understood that the above described device is merely illustrative of the principles of the present invention, and that other devices may be devised by those skilled in the art without departing from the spirit and scope of the invention as claimed below.

What is claimed is:

1. A water dish for supplying drinking water to animals, the dish comprising:

a bowl adapted to contain a reservoir of water;

a pump which supplies a pressurized fluid through an exit port;

a conduit in fluid communication with said exit port, said conduit including an outlet, and a pivot connected to said conduit for selectively positioning said conduit within said bowl whereby said pressurized fluid is discharged through the water;

wherein said conduit has an inlet for drawing the water from said bowl and wherein the pressurized fluid is water.

2. The water dish as in claim 1, further comprising a base, said bowl being selectively insertable within said base and said pivot being mounted to said base.

3. The water dish as in claim 2, wherein said conduit pivots between a first position in which said conduit is located remote from said drinking fluid and a second position in which said conduit is located within said drinking fluid.

4. The water dish as in claim 3, wherein said bowl is removable from said base when said conduit is in said first position.

5. The water dish as in claim 2, wherein said pivot is rotatably mounted to said base whereby said conduit is positionable to cause a circulation of the drinkable fluid.

6. The water dish as in claim 1, further comprising a control circuit for controlling the times during which said pump is actuated.

7. The water dish as in claim 6, wherein said control circuit includes a time delay between actuations of said pump.

8. The water dish as in claim 7, wherein said time delay is random.

9. The water dish as in claim 7, further comprising means for selecting the amount of said time delay.

10. A water dish for supplying dining water to animals, the dish comprising:

a bowl adapted to contain a reservoir of water;

a pump which supplies a fluid under pressure through an exit port, and a conduit in fluid communication with said exit port, said conduit being pivotally mounted relative to said bowl so that said fluid is dischargable into the water;

wherein said conduit has an inlet for drawing the water from said bowl and wherein the pressurized fluid is water.

11. The water dish as in claim 10, further comprising a base, the bowl being removably seated upon the base.

12. The water dish as in claim 11, wherein said conduit is positionable clear of said bowl to facilitate removal of said bowl from said base for refilling the reservoir of water.

13. The water dish as in claim 10, wherein said conduit is rotatably mounted relative to said bowl whereby said conduit is positionable to cause a circulation of the water in the bowl.

14. The water dish as in claim 10, wherein said pump is affixed to said base.

15. A water dish for supplying drinking water to animals, comprising:

a bowl adapted to contain a reservoir of water;

a pump which supplies a fluid under pressure through an exit port;

a conduit in fluid communication with said exit port, said conduit being pivotally mounted relative said bowl so that said fluid is dischargable into the water; and a control circuit for controlling the time delay between actuations of said pump.

16. A water dish for supplying drinking water to animals, comprising a bowl adapted to contain a reservoir of water;

an air pump which pumps a volume of air under positive pressure, a conduit in fluid communication with said air pump, said conduit being mounted for pivotal positioning within said bowl so that said air under positive pressure is dischargable into the water contained in the bowl.

17. The water dish as in claim 16, further comprising a base, said bowl being selectively insertable within said base and said conduit being positionable clear of the bowl to facilitate removal of the bowl from the base for refilling the reservoir of water.

18. The water dish as in claim 16, wherein said conduit is rotatably positionable to cause a circulation of the water contained in the bowl.

19. The water dish as in claim 16, further comprising a control circuit for controlling the times during which said pump is actuated.

\* \* \* \* \*